(12) United States Patent
Zhu et al.

(10) Patent No.: US 8,715,000 B2
(45) Date of Patent: May 6, 2014

(54) CONNECTOR ASSEMBLY

(71) Applicants: Hong Fu Jin Precision Industry (WuHan) Co., Ltd., Wuhan (CN); Hon Hai Precision Industry Co., Ltd., New Taipei (TW)

(72) Inventors: Zhi-Ming Zhu, Wuhan (CN); San-Yong Yang, Wuhan (CN); Ting Wang, Wuhan (CN)

(73) Assignees: Hong Fu Jin Precision Industry (WuHan) Co., Ltd., Wuhan (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/627,001

(22) Filed: Sep. 26, 2012

(65) Prior Publication Data

US 2013/0171878 A1    Jul. 4, 2013

(30) Foreign Application Priority Data

Dec. 29, 2011  (CN) .......................... 2011 1 0450572

(51) Int. Cl.
*H01R 11/00* (2006.01)
*H01R 13/66* (2006.01)

(52) U.S. Cl.
USPC ..................................... 439/505; 439/620.21

(58) Field of Classification Search
USPC ....................................... 439/620.21, 502, 505
See application file for complete search history.

(56) References Cited

U.S. PATENT DOCUMENTS

| | | | |
|---|---|---|---|
| 8,167,655 B2* | 5/2012 | Wang | 439/620.01 |
| 2001/0023141 A1* | 9/2001 | Chang | 439/76.1 |
| 2006/0028803 A1* | 2/2006 | Pocrass | 361/737 |
| 2008/0176444 A1* | 7/2008 | Chan et al. | 439/505 |
| 2009/0011652 A1* | 1/2009 | Koh | 439/638 |
| 2010/0068945 A1* | 3/2010 | Chou | 439/701 |
| 2010/0151723 A1* | 6/2010 | Su et al. | 439/505 |
| 2012/0170195 A1* | 7/2012 | Chang | 361/679.4 |

* cited by examiner

*Primary Examiner* — Briggitte R Hammond
(74) *Attorney, Agent, or Firm* — Novak Druce Connolly Bove + Quigg LLP

(57) ABSTRACT

A connector assembly includes an input/output device, a motherboard, at least one first cable, a first connector connected to the motherboard, a signal increasing connector located between the at least one first USB input/output connector and the first connector, and a power supply cable connected to the signal increasing connector and the motherboard The an input/output device includes at least one first USB input/output connector. The signal increasing connector divides the at least one cable into a first portion and a second portion. The first portion is connected to the signal increasing connector and the at least one first USB input/output connector, and the second portion is connected to the signal increasing connector and the first connector.

20 Claims, 5 Drawing Sheets

CONNECTOR ASSEMBLY

BACKGROUND

1. Technical Field

The present disclosure relates to electronic devices, more particularly to a connector assembly of an electronic device.

2. Description of Related Art

Connectors are used to connect a first component to a second component. Generally, the connector includes a contact, a terminal, an interface, and other conductors. In use, an USB connector is connected to a connector via a cable, and the connector is connected to a motherboard to communicate the USB connector with the motherboard. However, the USB connector is usually far away from the connector and a long cable needs to be used to connect the USB connector with the connector. Thus, a signal between the USB connector and the motherboard would be decreased because the signal is transmitted over the long cable. Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
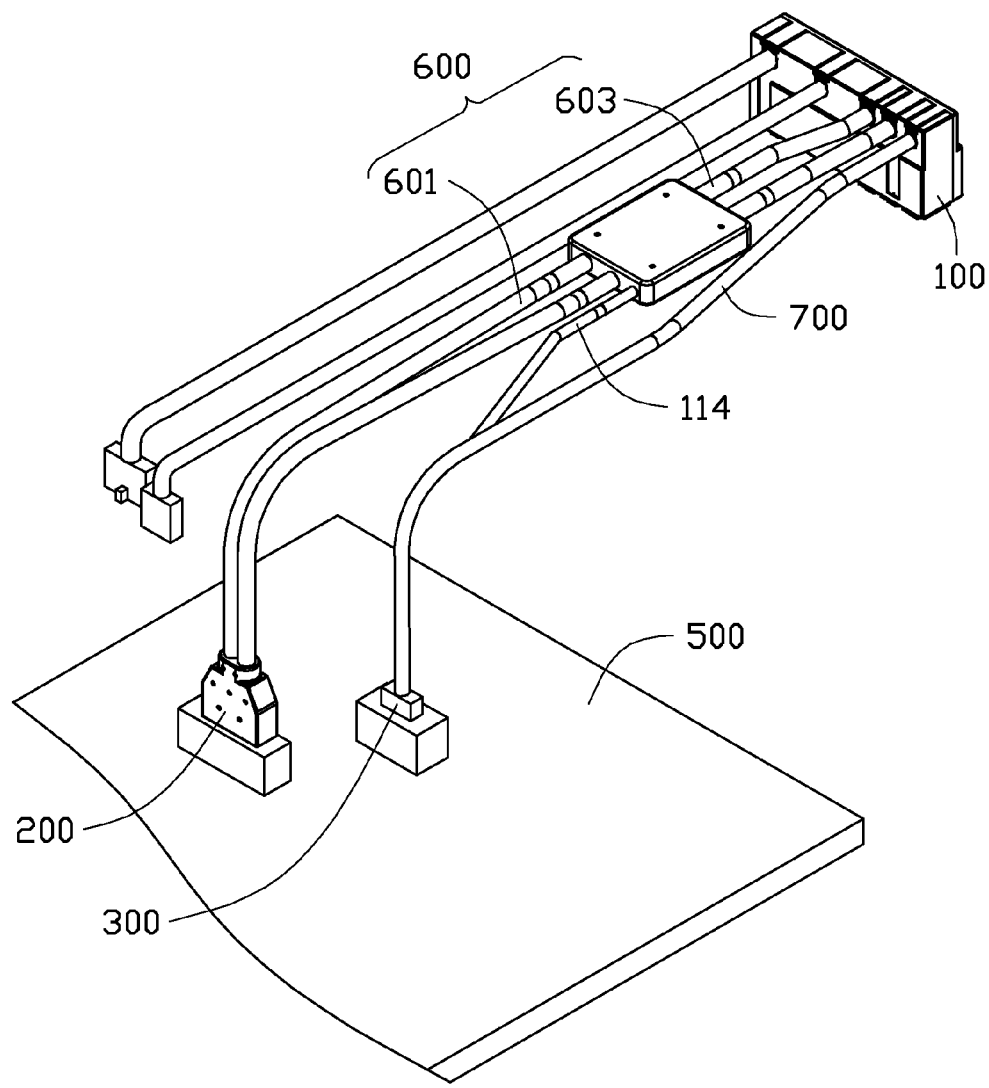
FIG. 1 is an exploded, isometric view of a connector assembly in accordance with an embodiment.
Figure 2:
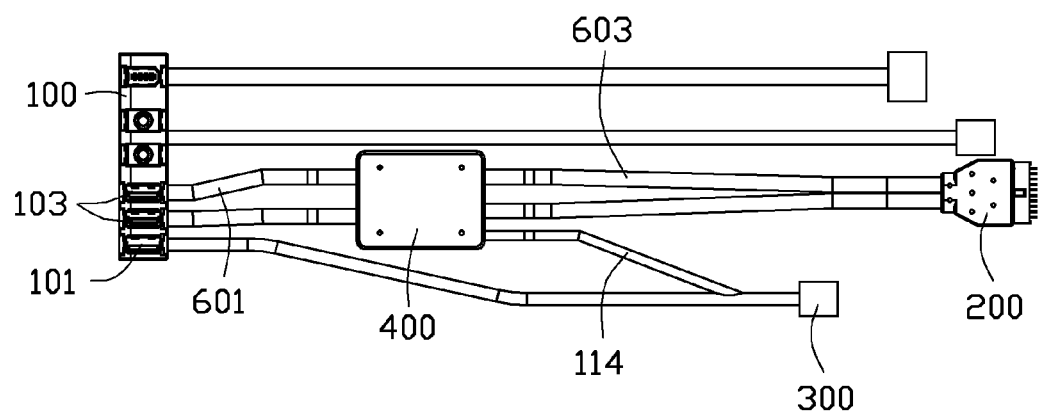
FIG. 2 is a front view of the connector assembly of FIG. 1.

FIGS. 1-2 illustrate a connector assembly in accordance with an embodiment. The connector assembly comprises an input/output device 100, a first connector 200, a second connector 300, a signal increasing connector 400, and a motherboard 500. In one embodiment, the input/output device 100 is attached to a front panel (not shown) of a computer case (not shown). The first connector 200 can be connected to a USB 3.0 connector, and the second connector 300 can be connected to a USB 2.0 connector.

At least one first USB input/output connector 103 and a second USB input/output connector 101 are connected to the input/output device 100. In one embodiment, a number of the at least one first USB input/output connector 103 is two, and the two first USB input/output connectors 103 are USB 3.0 input/output connectors. The second USB input/output connector 101 is a USB 2.0 input/output connector.

A first cable 600 is connected to the first connector 200 and each of the two first USB input/output connectors 103. A second cable 700 is connected to the second connector 300 and the second USB input/output connector 102. The signal increasing connector 400 are connected to two of the first cables 600 to divide each of the two first cables 600 to a first portion 601 and a second portion 603. In one embodiment, a length of the first portion 601 is 110 mm. The first portion 601 is connected to the signal increasing connector 400 and the input/output device 100. The second portion 603 is connected to the signal increasing connector 400 and the first connector 200.

Each of the first cable 600 comprises a plastic jacket 610, a plurality of center cores 650, and a plurality of dielectric insulators 630 enclosing the plurality of center cores 650. The plurality of dielectric insulators 630 are received in the plastic jacket 610.

The signal increasing connector 400 comprises a signal increasing circuit board 11 and a shielding device 30. In one embodiment, the shielding device 30 is used to prevent the signal increasing circuit board 11 from electromagnetic interference and electrostatic discharge, and the plurality of center cores 650 are attached to the signal increasing circuit board 11 by soldering. A plurality of electronic components 112 (only two shown in FIG. 3) are attached to the signal increasing circuit board 11. A power supply cable 114 is connected to the signal increasing circuit board 11. The power supply cable 114 is connected to the second connector 300, so that the motherboard 500 is connected to the signal increasing circuit board 11. In one embodiment, the power supply cable 114 can be also connected to the first connector 200.

The shielding device 30 comprises a first insulating member 31, a copper foil 32, and a second insulating member 33. The first insulating member 31 is secured to the signal increasing circuit board 11 and enclosing the signal increasing circuit board 11. In one embodiment, the first insulating member 31 is polyethylene and is secured to the signal increasing circuit board 11 by injection molding. The copper coil 32 is secured to a dielectric insulators 132 and located between the first insulating member 31 and the second insulating member 33. In one embodiment, the copper coil 32 is secured to the dielectric insulators 132 by soldering. The second insulating member 33 encloses the copper coil 32 to insulate the signal increasing circuit board 11. In one embodiment, after the first insulating member 31 and the signal increasing circuit board 11 are secured together, the second insulating member 33 is secured to the first insulating member 31 by injection molding. The second insulating member 33 is thermoplastic rubber. In one embodiment, a cross-section of the first insulating member 31 is substantially a rectangle, and the second insulating member 33 is substantially a rectangle.

Figure 3:
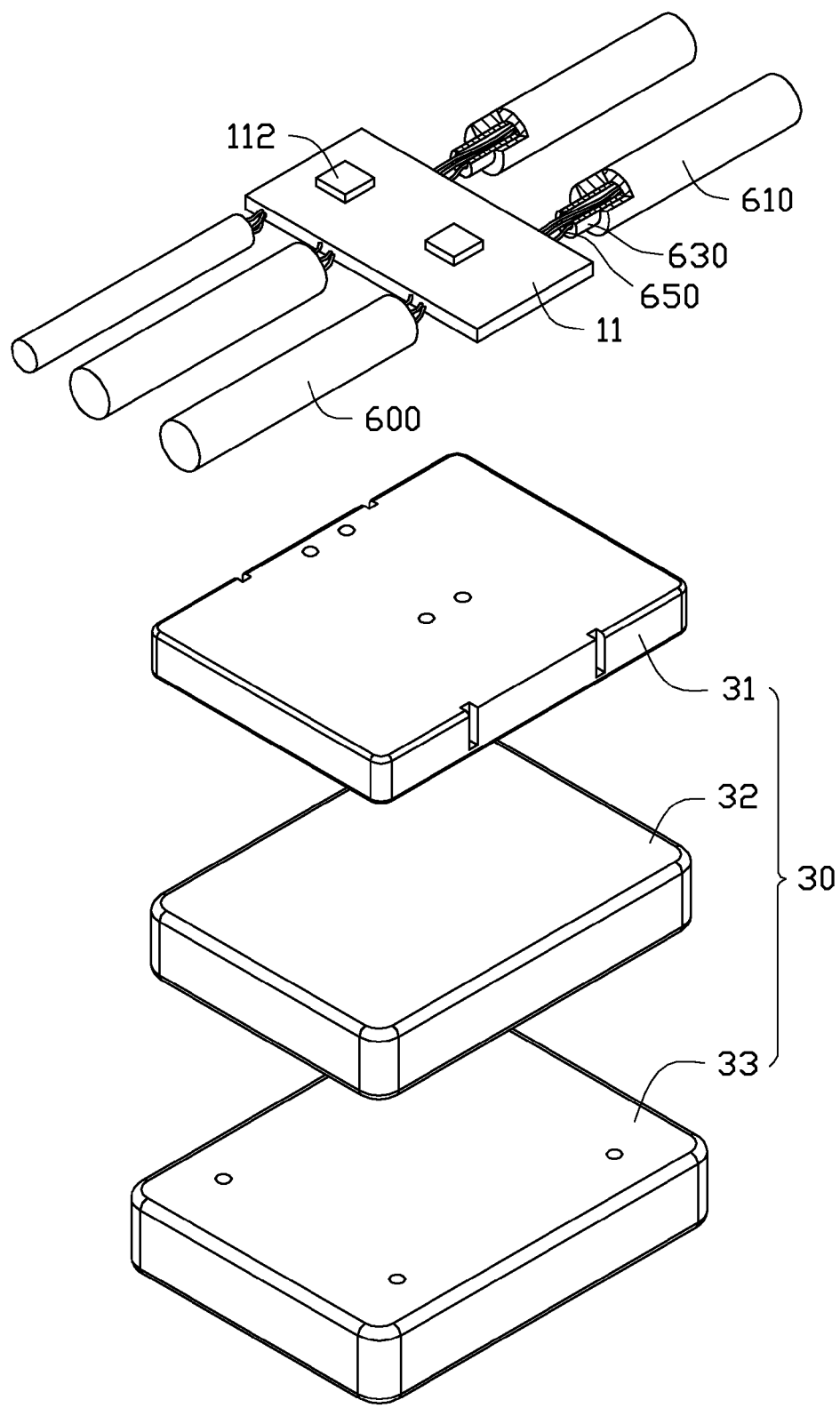
FIG. 3 is an exploded, isometric view of a signal increasing connector of the connector assembly of FIG. 1.
Figure 4:
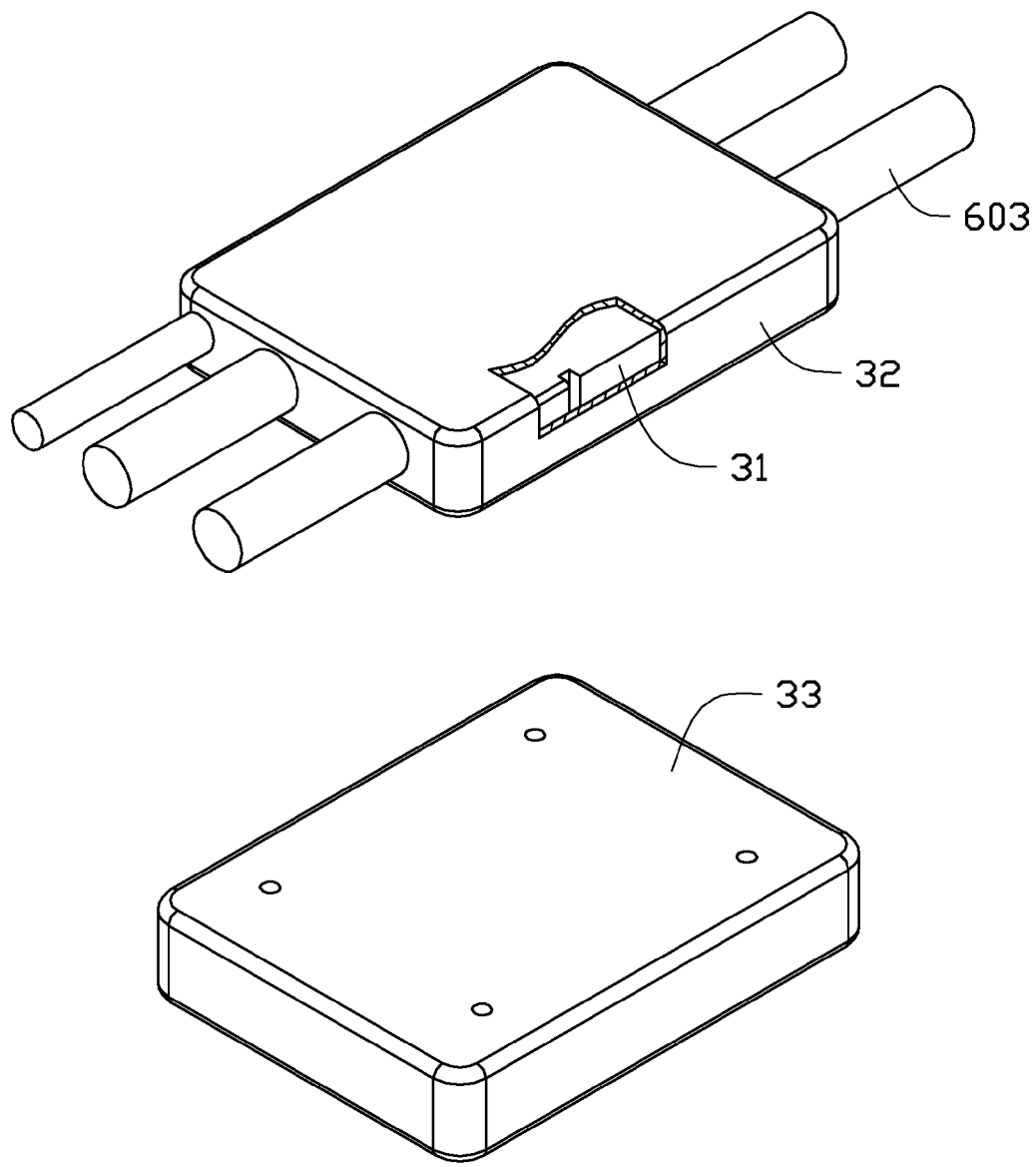
FIG. 4 is an assembled view of FIG. 3, and shows a second insulating member is not secured to a copper foil of the connector assembly of FIG. 1
Figure 5:
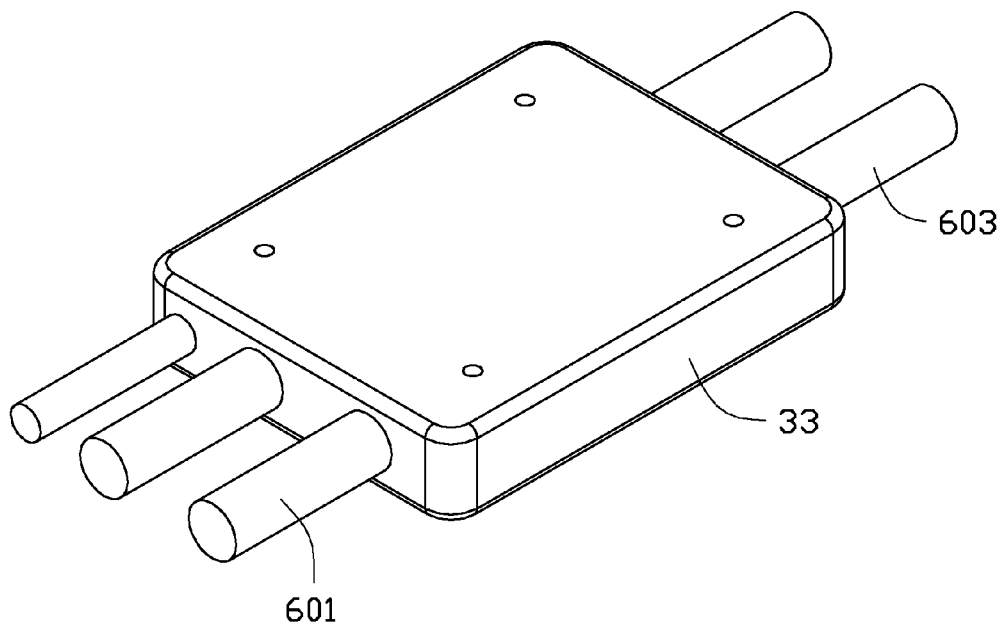
FIG. 5 is similar to FIG. 4, and the second insulating member is secured to a copper foil of the connector assembly of FIG. 1.

FIGS. 3-5 illustrate an assembled view of the connector assembly in accordance with an embodiment. In assembly, the plurality of center cores 650 is secured to the signal increasing circuit board 11. The signal increasing circuit board 11 with each of the first cables 600 is placed in a first mold (not shown), and a polyethylene material is fed into the first mold to form the first insulating member 31. Thus, the first insulating member 31 can enclose the signal increasing circuit board 11. The copper foil 32 encloses the first insulating member 31 and secured to the plurality of dielectric insulators 132 by soldering. The signal increasing circuit board 11 with the first insulating member 31 and the copper foil 32 is placed in a second mold (not shown), and a thermoplastic rubber material is fed into the second mold to form the second insulating member 33.

In use, the signal increasing circuit board 11 is enclosed by the copper foil 32, so that the signal increasing circuit board 11 can be protected from disturbing by false signals from the outside of the signal increasing circuit board 11 or the inside of the signal increasing circuit board 11. The copper foil 32 is connected to the plurality of dielectric insulators 630, so that the copper foil 32 can be for ground. Therefore, the false signal from the outside of the signal increasing circuit board 11 or the inside of the signal increasing circuit board 11 can be transferred to the ground.

In addition, the first insulating member 31 and the second insulating member 33 are made by injection molding. The signal increasing circuit board 11 is protected by the first insulating member 31 and the second insulating member 33, so that each of the plurality of electronic components 112, the solder joint between each of the plurality of center cores 650, and the signal increasing circuit board 11 and the solder joint between the copper foil 32 and the plurality of dielectric insulators 630 can be protected well. The first insulating member 31 is substantially a rectangle, and the copper foil 32 can be easily enclosed on the first insulating member 31.

The signal increasing connector 400 is located between the first connector 200 and the input/output device 100, and the length of the first portion 601 is 100 mm. Therefore, the transmission signal between the input/output connector 100 and the motherboard 500 cannot be decreased by the first cable 600.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A connector assembly comprising:
    an input/output device comprising at least one first USB input/output connector;
    a motherboard;
    at least one first cable;
    a first connector connected to the motherboard;
    a signal increasing connector located between the at least one first USB input/output connector and the first connector; the signal increasing connector divides the at least one first cable into a first portion and a second portion; and
    a power supply cable connected to the signal increasing connector and the motherboard;
    wherein the first portion is connected to the signal increasing connector and the at least one first USB input/output connector, and the second portion is connected to the signal increasing connector and the first connector.

2. The connector assembly of claim 1, wherein a number of the at least one first USB input/output connector is two, a number of the at least one first cable is two, and each of the two first cables is connected to the first connector, the signal increasing connector, and each of the two first USB input/output connectors.

3. The connector assembly of claim 2, wherein each of the at least one first USB input/output connector is an USB 3.0 connector.

4. The connector assembly of claim 1, further comprising a second cable connected to the power supply cable and a second connector connected to the power supply cable, wherein the input/output device further comprises a second USB input/output connector, and the second cable is connected to the second USB input/output connector and the second connector.

5. The connector assembly of claim 4, wherein the second USB input/output connector is an USB 2.0 connector.

6. The connector assembly of claim 1, wherein the signal increasing connector comprises a signal increasing circuit board, the at least one first cable comprising a plastic jacket, a center core, and a dielectric insulator enclosing the center core; the dielectric insulator is received in the plastic jacket, and the center core is attached to the signal increasing circuit board.

7. The connector assembly of claim 6, wherein the signal increasing connector further comprises a shielding device, the shielding device comprises a first insulating member, a copper foil, and a second insulating member; the signal increasing circuit board is enclosed by the first insulating member, the at least one first cable extends out of the first insulating member, the copper foil encloses the first insulating member and is connected to the dielectric insulator, and the second insulating member encloses the copper foil.

8. The connector assembly of claim 7, wherein the copper foil is attached to an outer surface of the first insulating member.

9. The connector assembly of claim 7, wherein the first insulating member and the signal increasing circuit board is secured together by injection molding.

10. The connector assembly of claim 7, wherein the first insulating member is polyethylene.

11. The connector assembly of claim 1, wherein a length of the first portion of the at least one first cable is 110 mm.

12. A connector assembly comprising:
    an input/output device comprising at least one first USB input/output connector and a second USB input/output connector;
    a motherboard;
    at least one first cable and a second cable;
    a first connector and a second connector, each of the first connector and the second connector is connected to the motherboard;
    a signal increasing connector secured to the at least one first cable to divide the at least first one cable into a first portion and a second portion; and
    a power supply cable connected to the signal increasing connector and the motherboard;
    wherein the first portion is connected to the signal increasing connector and the at least one first USB input/output connector, the second portion is connected to the signal increasing connector and the first connector, and the second cable is connected to the second connector and the second USB input/output connector.

13. The connector assembly of claim 12, wherein a number of the at least one first USB input/output connector is two, a number of the at least one first cable is two, and each of the two first cables is connected to the first connector, the signal increasing connector, and each of the two first USB input/output connectors.

14. The connector assembly of claim 12, wherein each of the at least one first USB input/output connector is an USB 3.0 connector.

15. The connector assembly of claim 12, wherein the second USB input/output connector is an USB 2.0 connector.

16. The connector assembly of claim 12, wherein the signal increasing connector comprises a signal increasing circuit board, the at least one first cable comprises comprising a plastic jacket, a center core, and a dielectric insulator enclosing the center core; the dielectric insulator is received in the plastic jacket, and the center core is attached to the signal increasing circuit board.

17. The connector assembly of claim 16, wherein the signal increasing connector further comprises a shielding device, the shielding device comprises a first insulating member, a copper foil, and a second insulating member; the signal increasing circuit board is enclosed by the first insulating member, the at least one first cable extends out of the first insulating member, the copper foil encloses the first insulating member and is connected to the dielectric insulator, and the second insulating member encloses the copper foil.

18. The connector assembly of claim 17, wherein the copper foil is attached to an outer surface of the first insulating member.

19. The connector assembly of claim 17, wherein a cross-section of the first insulating member is substantially a rectangle.

20. The connector assembly of claim 12, wherein a length of the first portion of the at least one first cable is 110 mm.

* * * * *